US012101219B2

(12) United States Patent
Thubert et al.

(10) Patent No.: US 12,101,219 B2
(45) Date of Patent: Sep. 24, 2024

(54) SELECTIVE DISAGGREGATION ADVERTISEMENT FOR ROUTING IN MULTI-PLANE TOPOLOGIES

(71) Applicant: Cisco Technology, Inc., San Jose, CA (US)

(72) Inventors: Pascal Thubert, Roquefort les Pins (FR); Nagendra Kumar Nainar, Morrisville, NC (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/103,918

(22) Filed: Jan. 31, 2023

(65) Prior Publication Data
US 2023/0179471 A1 Jun. 8, 2023

Related U.S. Application Data

(63) Continuation of application No. 17/094,540, filed on Nov. 10, 2020, now Pat. No. 11,632,290.

(51) Int. Cl.
*H04L 12/24* (2006.01)
*H04L 41/0668* (2022.01)
(Continued)

(52) U.S. Cl.
CPC .......... *H04L 41/0668* (2013.01); *H04L 41/12* (2013.01); *H04L 45/28* (2013.01); *H04L 47/24* (2013.01)

(58) Field of Classification Search
CPC ......... H04L 45/28; H04L 45/22; H04L 45/00; H04L 47/125; H04L 69/40;
(Continued)

(56) References Cited

U.S. PATENT DOCUMENTS

| 2003/0058871 A1* | 3/2003 | Sastry ................ H04L 47/2408 370/468 |
| 2012/0039161 A1 | 2/2012 | Allan et al. |

(Continued)

OTHER PUBLICATIONS

Office Action for U.S. Appl. No. 17/094,540, mailed on Aug. 18, 2022, Thubert, "Selective Disaggregation Advertisement for Routing in Multi-Plane Topologies", 12 Pages.
(Continued)

*Primary Examiner* — Romani Ohri
(74) *Attorney, Agent, or Firm* — Lee & Hayes, P.C.

(57) ABSTRACT

Techniques for identifying nodes in a data center fabric that are affected by a failure in the fabric, and selectively sending disaggregation advertisements to the nodes affected by the failure. The techniques include a process where a component monitors the network fabric to identify communication paths between leaf nodes, and determines what leaf nodes would be affected by a failure in those communication paths. The component may detect a failure in the network and determine which communication paths, and thus which leaf nodes, are affected by the failure and send disaggregation advertisements to the affected leaf nodes. In some examples, ingress leaf nodes send data through the fabric that indicate egress nodes for the communication paths. Intermediate nodes along may receive the data from the leaf nodes to identify communication paths, and the notify only affected nodes upon detecting a failure in the network.

20 Claims, 10 Drawing Sheets

(51) Int. Cl.
*H04L 41/12* (2022.01)
*H04L 45/28* (2022.01)
*H04L 47/24* (2022.01)

(58) Field of Classification Search
CPC ... H04L 41/0654; H04L 45/12; H04L 45/123; H04L 45/302; H04L 69/14
See application file for complete search history.

(56) References Cited

U.S. PATENT DOCUMENTS

| | | | |
|---|---|---|---|
| 2013/0201820 A1* | 8/2013 | Xiaoyong | H04L 45/586 370/220 |
| 2013/0259056 A1* | 10/2013 | Kotrabasappa | H04L 45/28 370/389 |
| 2015/0222557 A1* | 8/2015 | Bhattacharya | H04L 45/22 370/237 |
| 2015/0317197 A1* | 11/2015 | Blair | H04L 41/147 714/47.3 |
| 2017/0048137 A1* | 2/2017 | Shanmugalingam | H04W 76/11 |
| 2017/0070387 A1* | 3/2017 | Rao | H04L 41/40 |
| 2019/0149896 A1* | 5/2019 | Grammel | H04J 14/0272 398/3 |
| 2020/0259746 A1 | 8/2020 | Thubert et al. | |
| 2020/0296028 A1 | 9/2020 | Nainar et al. | |
| 2021/0320736 A1 | 10/2021 | Li et al. | |
| 2021/0385155 A1* | 12/2021 | Suryanarayana | H04L 45/76 |
| 2022/0150105 A1 | 5/2022 | Thubert et al. | |
| 2023/0247244 A1* | 8/2023 | Zlatniczki | H04N 21/2402 725/47 |

OTHER PUBLICATIONS

Giorgetti, et al., "Segment Routing for Effective Recovery and Multi-domain Traffic Engineering", Article in Journal of Optical Communications and Networking · Feb. 2, 2017, 12 pages.

* cited by examiner

SELECTIVE DISAGGREGATION ADVERTISEMENT FOR ROUTING IN MULTI-PLANE TOPOLOGIES

RELATED APPLICATIONS

This application claims priority to and is a continuation of U.S. patent application Ser. No. 17/094,540, filed on Nov. 10, 2020, the entire contents of which are incorporated herein by reference.

TECHNICAL FIELD

The present disclosure relates generally to techniques for disaggregation advertising of prefixes to improve traffic routing in data center network fabrics with multi-plane topologies.

BACKGROUND

With the continued increase in the proliferation and use of devices with Internet accessibility, the demand for Internet services and content has similarly continued to increase. The providers of the Internet services and content continue to scale the computing resources required to service the growing number of user requests without falling short of user-performance expectations. For instance, providers typically utilize large and complex data centers to manage the network and content demands from users. The data centers generally comprise server farms that host workloads that support the services and content, and further include network devices such as switches and routers to route traffic through the data centers and enforce security policies.

These data center networks have continued to increase in size in order to meet these processing demands, and the increase in size raises various scaling challenges for devices, or nodes, in the data center fabric. To address the scalability challenges in switched data-center fabrics (a network topology that uses switches), various network topologies have emerged, such as leaf-spine network topologies, fat-tree network topologies, Clos network topologies, and so forth. In many of these network topologies, servers in the data centers are connected to "leaf" switches, which may be arranged as "top-of-rack" or ToR switches. Each leaf switch then has connections to one or more "spine" switches, or "super spine" switches. Depending on the network topology, the leaf switches may be connected to the spine switches through one or more layers of middle switches (or intermediate switches). In some examples, each leaf switch has connections to all spine switches in a plane, but the spine switches are not connected directly together. Thus, any packet from a given server to another server in another rack goes through the sending server's leaf, then one of the spine switches (potentially through a middle switch), then the receiving server's leaf switch. The leaf switches, and/or the middle switches, may use equal-cost multipath (ECMP) routing to distribute traffic across the set of spine switches. These network topologies are able to easily scale out to fairly large numbers of servers by adding more switches, thereby increasing the scalability of data center fabrics.

However, various challenges arise when implementing routing in these network topologies. For instance, one specific challenge is the problem of link failures between two nodes within a network and/or failure of nodes themselves (e.g., intermediate nodes, spine nodes, etc.). Such failures can result in black holes in the network where traffic destined to, or originating from, a particular network prefix is unable to arrive at an intended particular network prefix. For instance, traffic that hits a black hole may simply arrive and remain at an intermediate and/or spine node, or be returned to the ingress leaf node, due to the failure.

To help remediate the effects of failures, existing routing protocols use the concept of prefix disaggregation, such as positive disaggregation and negative disaggregation. In positive disaggregation, upon detecting a failure, an intermediate and/or spine node creates and advertises a routing policy to downstream nodes that instructs the downstream nodes to use one or more of the functioning nodes to reach the affected prefix. Conversely, in negative disaggregation, upon detecting a failure, an intermediate node creates and advertises a routing policy to downstream nodes that instructs the downstream nodes to not use the intermediate nodes affected by the failure to reach the affected prefix. Various routing protocols include disaggregation techniques, such as Open Shortest Path First (OSPF), Intermediate System to Intermediate System (ISIS), Routing in Fat Trees (RITF), and other protocols.

However, various inefficiencies exist with these existing disaggregation techniques. For instance, the disaggregation notification (e.g., updated routing policy) may be propagated to all leaf nodes irrespective of any traffic flows affected by the failure, or any existing traffic flow at all. This is inefficient for a network to propagate disaggregation notifies to nodes that are not affected by the failures. Further, the existing disaggregation techniques work such that spine nodes and/or intermediate nodes propagate the updated routing policies southward in the network topology, which can be a relatively slow process for the affected leaf nodes to receive the updated routing policies. In that time, the leaf nodes may continue to use the path with the failure in it, and traffic may be affected negatively.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
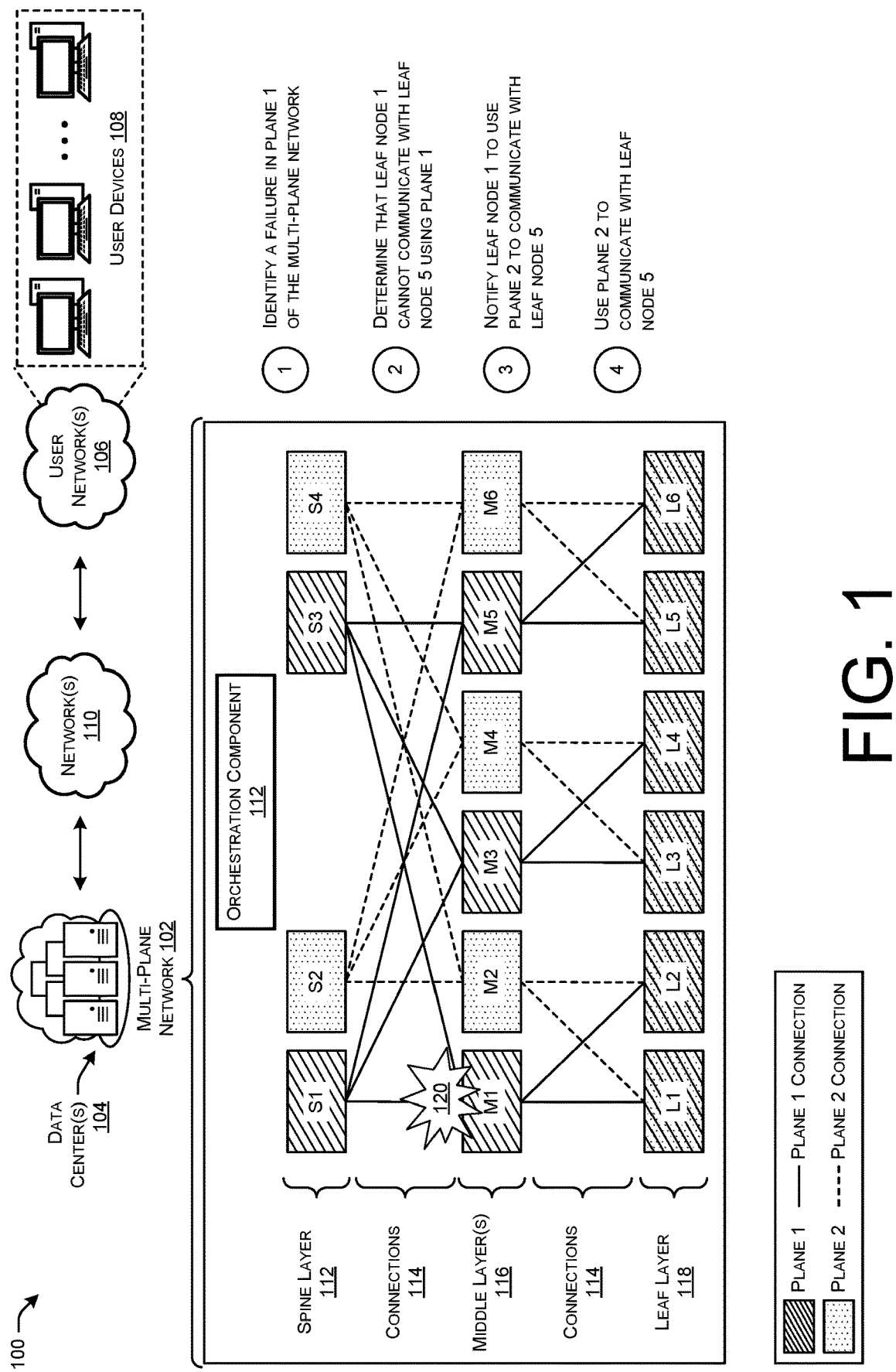
FIG. 1 illustrates a system diagram of an example architecture for sending a disaggregation advertisement of a prefix affected by a failure to only affected nodes in a multi-plane topology.

The disclosure describes a method for selectively identifying nodes in a data center fabric that are to receive disaggregation advertisements of prefixes to improve traffic routing in multi-plane topologies. The method may be performed using control-plane techniques by an orchestration component (e.g., software defined network (SDN) controller) that manages data flows in the network with the multi-plane topology. The method may include identifying, by the orchestration component, a failure in a first plane of the multi-plane network, and determining that communication paths to a first leaf node are affected by the failure in the first plane. Further, the method includes identifying, by the orchestration component, a second leaf node having a first communication path to the first leaf node that is affected by the failure in the first plane, and causing the second leaf node to communicate with the first leaf node using a second communication path in a second plane of the multi-plane network.

The disclosure further describes a second method for selectively notifying nodes in a data center fabric that are to receive disaggregation advertisements of prefixes to improve traffic routing in multi-plane topologies. The second method may be performed using data-plane techniques by nodes in the network with the multi-plane topology. The second method may include communicating, by a first leaf node, with a second leaf node using a first communication path in a first plane of a multi-plane network. Further, the second method may include modifying a data packet to send to the second leaf node at least partly using an Operations, Administration, and Maintenance (OAM) framework, where the data packet includes OAM data such as an indication of the second leaf node and of a spine node of the first communication path. Additionally, the second method may include sending, from the first leaf node, the data packet to the second leaf node using the first communication path, and receiving, at the first leaf node, a notification from an intermediate node in the first communication path indicating that there is a failure in the first plane that affects the first communication path. Further, the second method may include communicating, by the first leaf node, with the second leaf node using a second communication path in a second plane of the multi-plane network.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for identifying nodes in a data center fabric that are affected by a failure in the fabric, and selectively sending disaggregation advertisements to the nodes affected by the failure to improve traffic routing in network topologies. The techniques described herein include a control-plane process where an orchestration component monitors the network fabric to identify communication paths between leaf nodes, and determine what leaf nodes would be affected by a failure in those communication paths. Upon detecting a failure in the network, the orchestration component may determine which communication paths, and thus which leaf nodes, are affected by the failure. The orchestration component may then selectively send disaggregation advertisements to the leaf nodes that are actually affected by the failure. Further, the techniques include a data-plane process where ingress leaf nodes send Operations, Administration, and Maintenance (OAM) data through the communication paths that indicate egress nodes and/or spine nodes for the communication paths. Intermediate nodes along the communication paths may receive the OAM data from the leaf nodes to identify the communication paths, and upon detecting a failure in the network that affects communication paths, the notify only the affected nodes of the failure.

In some instances, the techniques may be performed in multi-plane networks (e.g., multi-plane topologies, multi-plane architectures, multi-plane environments, etc.) in which multiple data planes are usable by the nodes in the network. The multi-plane networks may use multi-plane routing (MPR) techniques were there are multiple, alternative paths (from each source-destination pair) through a network. For instance, an ingress leaf node may be able to send traffic flows to a particular egress leaf node through a first communication path in a first plane of the network, and also send traffic flows to the particular egress leaf node through a second communication path in a second plane of the network. Further, the leaf nodes may be able to perform load balancing for sending traffic flows through the different planes of the multi-plane network, such as ECMP routing, to distribute the traffic flows. In some examples, the planes may include respective spine switches and intermediate switches that are devoted to communicating traffic in that single plane, but are generally reachable by the leaf switches in the data center fabric. Thus, failures in communications paths the first plane may not affect the communication paths in the second plane as there are different spine switches and intermediate switches in the second plane. However, the leaf switches may have at least one connection to each of the different planes in the multi-plane network, and thus have multiple communication paths to other leaf switches in the fabric.

In some examples, the techniques include a control-plane process where an orchestration component (e.g., SDN controller, control-plane system, etc.) monitors the multi-plane network in order to identify communication paths between nodes in the multi-plane network. For instance, the orchestration component may receive telemetry data from network devices in the multi-plane network (e.g., switches, routers, servers, etc.) using various techniques, such as Simple Network Management Protocol (SNMP), model-driven telemetry, event-driven telemetry (EDT), Operations, Administration, and Maintenance (OAM), and/or any other mechanism. The orchestration component may analyze the telemetry data in order to determine traffics flows between devices, such as traffic flows between of ingress leaf nodes and egress leaf nodes. The orchestration component may generate mappings, such as in mappings tables, that indicate established communication paths between ingress leaf nodes and egress leaf nodes based on the analysis of the telemetry data. Further, the orchestration component may identify communication paths between ingress leaf nodes and egress leaf nodes in the different planes of the multi-plane network. In this way, the orchestration component is able to identify, from the mappings, what ingress leaf nodes would be affected if a failure occurred that affected a particular egress leaf node.

Additionally, or alternatively, the orchestration component may receive explicit indications from leaf nodes to determine the mappings, and/or implicit indications from leaf nodes to determine the mappings. For instance, leaf nodes may send explicit notification to the orchestration component indicating other leaf nodes with which they are communicating and potentially other information, such as the spine node being used to reflect the traffic flow to and from the other leaf node and/or the plane through which the traffic flow is being sent. In this way, the leaf nodes can send explicit indications as to the orchestration component indicating the communication paths with other leaf nodes. With respect to the implicit indications, the orchestration component may have further responsibilities for managing the multi-plane network, such as helping nodes establish secure tunnels (e.g., overlays). For instance, the leaf nodes may establish secure, encrypted tunnels between each other (e.g., from leaf to leaf) to encrypt traffic as it flows through the multi-plane network, such as by using a Virtual Extensible LAN (VXLAN) overlay. The leaf nodes may request that the orchestration component help establish the tunnel by providing an endpoint. The orchestration component may then provide an endpoint for the leaf node to establish a tunnel with to reach the desired server/application. In this way, the orchestration component may determine which leaf nodes have established network overlays and generate mappings between those leaf nodes to indicate the communication paths.

The orchestration component may continue to monitor the multi-plane network, such as by collecting telemetry data, in order to detect and locate failures in the network. Upon detecting a failure, or receiving an indication from a network device that a failure exists in the network, the orchestration component may determine what leaf nodes are affected by the failure. In a specific example, the orchestration component may first determine a plane in which the failure has occurred in the multi-plane network, and determine (e.g., based on a network topology), which egress leaf nodes have communication paths that are affected by the failure. The orchestration component may then identify, from the mappings for the plane with the failure, which ingress leaf nodes are sending traffic to the identified egress leaf nodes. After identifying which ingress leaf nodes are sending traffic to the egress leaf nodes with communication paths affected by the failure, the orchestration component may send disaggregation advertisements (e.g., failure notifications) to only the ingress leaf nodes that are sending traffic (or are likely to send traffic in the near future) to the egress leaf nodes that are affected by the failure. In this way, a control-plane component and/or system may send targeted disaggregation advertisements to only the leaf nodes that are affected by the failure, and more quickly than existing techniques.

In some instances, the orchestration component may further send, potentially along with the disaggregation advertisement, instructions for the affected ingress leaf nodes regarding their load balancing techniques. That is, rather than providing routing information that might change a routing table of the ingress leaf nodes, the orchestration component may send load-balancing instructions indicating one or more planes that the ingress leaf nodes are not to use to reach a particular egress leaf nodes, and/or indicating one or more planes that the ingress leaf nodes are to use to reach the particular egress leaf nodes. In this way, the routing tables need not be modified, but the load-balancing techniques of the leaf nodes may be modified for at least a period of time (e.g., a predefined waiting period to allow the failure to clear or otherwise be remedied).

In some examples, the techniques include a data-plane process where an intermediate node in the multi-plane network (e.g., intermediate node, spine node, etc.) identifies communication paths between pairs of leaf nodes, determines when failures have occurred in the network, and sends data-plane notifications to the affected leaf nodes indicating that the failure has occurred. To accomplish this, the leaf nodes may leverage an in-band mechanism, such as in-situ Operations, Administration, and Maintenance (iOAM) or a similar mechanism, to include control-plane information about the communication path in a data plane packet. The information may indicate, for example, an indication of the source IP address for the packet, the destination IP address for the packet, the egress leaf node to which the packet is destined, a spine node that is reflecting the data packet, and/or a plane through which the packet is passing. The intermediate nodes (e.g., any node on the communication path of the data packet) may identify the control-plane information for that packet and determine which what leaf nodes are communicating with each other. Upon detecting a failure in the network, the intermediate nodes may determine which egress leaf nodes are affected by the failure, and in turn, which ingress leaf nodes are affected by the failure in that they are communicating with the affected egress leaf nodes in the affected plane. The intermediate nodes may then send a failure notification, or a disaggregation advertisement, (e.g., control-plane data in a data-plane packet) to the affected ingress nodes to modify their load-balancing techniques, as explained above.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram 100 of an example architecture for sending a disaggregation advertisement of a prefix affected by a failure to only affected nodes in a multi-plane topology.

As illustrated, the environment 100 may include a multi-plane network 102 that includes devices housed or located in one or more data centers 104. The multi-plane network 102 may include one or more networks implemented by any viable communication technology, such as wired and/or wireless modalities and/or technologies. The multi-plane network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The multi-plane network 102 may include devices, virtual resources, or other nodes that relay packets from one network segment to another by nodes in the computer network. The multi-plane network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of multi-plane network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the multi-plane networks 102 may not be located in explicitly defined data centers 104, but may be located in other locations or buildings.

In some instances, the multi-plane network 102 may provide services and/or computing resources to one or more user networks 106 comprising one or more user devices 108. For instance, the data centers 104 may include servers that provide scalable computing resources and/or host services or applications that the user devices 108 desire to use or interact with, such as web-based applications, services managed by cloud service providers, datastores or services of enterprise networks, and/or any other type of service or application. To interact with these services and/or applications, the user devices 108 may establish communication connections over one or more networks 110. The network(s) 110 may include any viable communication technology, such as wired and/or wireless modalities and/or technologies. Networks 126 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user device 108 and headend device 108 may communicate using any type of protocol over the network 110, such as the transmission control protocol/Internet protocol (TCP/IP) that is used to govern connects to and over the Internet.

FIG. 1 illustrates a simple network fabric of a multi-plane network 102 having a spine-leaf structure that includes nodes in a spine layer 112 (e.g., spine nodes 112, top of fabric (ToF) nodes, super spine nodes, etc.), nodes in a middle layer 116 (e.g., middle nodes 116 or intermediate nodes 116), and nodes in a leaf layer 118 (e.g., leaf nodes 118). Nodes in the different layers may be communicatively coupled to each other through connections 114, which generally represent connectivity and not actual physical links. Generally, one or more network prefixes can be associated with each of the leaf nodes 118 such as network prefixes. Some, or all, of the nodes in each of the layers may be switches and be included a switched data-center fabric, such as a leaf-spine network topology, fat-tree network topology, Clos network topology, and so forth.

As described above, scaling of data centers and network fabrics can be inhibited by limitations in switch sizes. Accordingly, the scaling may be achieved by interconnecting hundreds or thousands of smaller switches (also referred to herein as "node"). In the example network fabric the multi-plane network 102, due to a size of the fabric and limitations on number of ports, the different intermediate nodes 116 and spine nodes 112 can be partitioned into different planes, in this case, plane 1 and plane 2 (however, the techniques of this application are generally applicable to any number of planes). Each plane in the multi-plane network 102 provides a different path for the leaf nodes to communicate with each other. That is, plane 1 includes intermediate nodes 116 and spine nodes 112 that send traffic between leaf nodes, but do not communicate with intermediate nodes 116 and spine nodes 112 that are designated as being included in plane 2. As illustrated, there are plane 1 connections 114 between plane 1 intermediate nodes 116 and spine nodes 112, and also plane 2 connections between intermediate nodes 116 and spine nodes 112. However, the leaf nodes 118 may have plane 1 connections 114 as well as plane 2 connections 114 such that the leaf nodes 118 are able to communicate with each other using multiple paths through the multiple planes. Although illustrated as only having one connection to each of plane 1 and plane 2, the leaf nodes 118 may have multiple connections to one or more of the planes, and may further have connections to additional planes beyond just two planes (not illustrated).

As noted above, the leaf nodes 118 may be connected to servers that are hosting applications, but the leaf nodes may additionally, or alternatively, be connected to other types of devices that send traffic through the multi-plane network 102 for various reasons. For instance, the leaf nodes 118 may be connected to, and send traffic through the network 102 on behalf of, devices (or "endpoints") such as general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints can also include Internet of Things (IoT) devices or equipment, such as agricultural equipment, connected cars and other vehicles, smart home sensors and devices (e.g., alarm systems, security cameras, lighting, appliances, media players, HVAC equipment, utility meters, windows, automatic doors, door bells, locks, etc.), healthcare devices (e.g., pacemakers, biometric sensors, medical equipment, etc.), industrial equipment (e.g., robots, factory machinery, construction equipment, industrial sensors, etc.), retail equipment (e.g., vending machines, point of sale (POS) devices, Radio Frequency Identification (RFID) tags, etc.), smart city devices (e.g., street lamps, parking meters, waste management sensors, etc.), and so forth.

Generally, ingress leaf nodes 118 use various load balancing techniques in order to send traffic flows through the multi-plane network 102, such as Equal-Cost Multi-Path (ECMP) load balancing (and/or any other type of load balancing technique). Thus, ingress leaf nodes 118 may have traffic flows through plane 1 as well as plane 2, or at least be configured to load balance traffic flows between the two planes in order to reach desired egress leaf nodes 118. The nodes in the multi-plane network 102 may store routing tables that are used to keep track of communication paths in order to determine which way to forward traffic through the network 102. Accordingly, the leaf nodes 118 may send traffic to other leaf nodes 118, and the spine nodes 112 may reflect the traffic that is sent from an ingress leaf node 118 to a target egress leaf node using the routing tables and through the plane that the traffic was sent through.

However, a noted above, failures may occur in the multi-plane network 102 that can cause traffic blackouts. For instance, the multi-plane network 102 may experience failures in northbound connections 114 between leaf nodes and intermediate nodes 116 and/or intermediate nodes 116 to spine nodes 112, and/or southbound connections 114 between spine nodes 112 to intermediate nodes 116 and/or intermediate nodes 116 to leaf nodes 118. In some instances, the network 102 may experience failures in the actual nodes themselves, such as failures cased by misconfiguration of the nodes, security breaches, old equipment compatibility issues, hardware failures, firmware failures, software failures, and/or any other type of failure.

At "1," a device may identify a failure 120 in plane 1 of the multi-plane network 102. As noted above, and described in more detail with respect to FIG. 2, an orchestration component 112 of the multi-plane network 102 may collect telemetry data from network devices/nodes and determine that the failure 120 has occurred. In some examples, as noted above and described in more detail with respect to FIG. 5, a node in the network 102 (e.g., intermediate node 116 M1) may detect the failure 120.

At "2," a device in the network 120 may determine that leaf node 1 cannot communicate with leaf node 5 due to the failure 120. For instance, at least one of the orchestration component 112 or the intermediate node M1 may determine that traffic send from L1 and through plane 1 is unable to reach S1 and/or S3 due to the failure 120.

At "3," the device may notify leaf node 1 to use plane 2 in order to communicate with leaf node 5. For instance, at least one of the orchestration component 112 or the intermediate node M1 may send a failure advertisement to leaf node 1 (and/or other leaf nodes affected by the failure 120) indicating that leaf node 1 is to no longer load balance traffic through plane 1 at least to reach leaf node 5, and to use a different plane. At "4," leaf node 1 may begin using plane 2 to communicate with leaf node 5, such as by sending traffic over the connection 114 to the intermediate node M2.

The multi-plane network 102 is illustrated as a simple spine-leaf network with switches, but this is merely for illustrative purposes. The multi-plane network 102 may include different numbers and/or types of endpoints, nodes, cloud components, servers, software components, devices, virtual or physical resources, configurations, topologies, services, appliances, or deployments are also contemplated herein. Further, the multi-plane network 102 can include any number or type of resources, which can be accessed and utilized by endpoints or network devices. The illustrations and examples provided herein are for clarity and simplicity.

Figure 2:
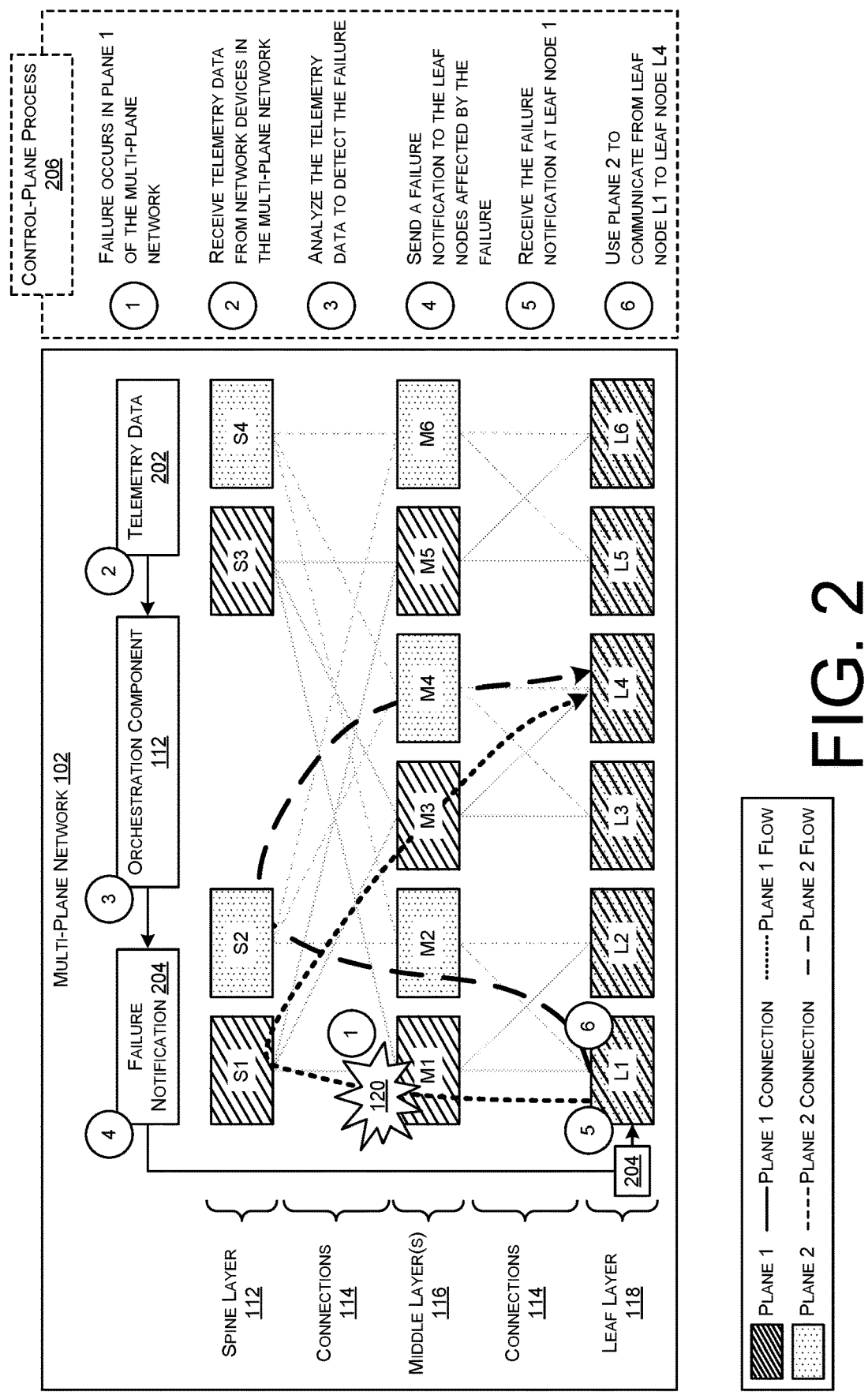
FIG. 2 illustrates a system diagram of an example architecture for a control-plane process where an orchestration component sends a disaggregation advertisement of a prefix affected by a failure to only affected nodes in a multi-plane topology.

FIG. 2 illustrates a system diagram 200 of an example architecture for a control-plane process where an orchestration component 112 sends a disaggregation advertisement of a prefix affected by a failure to only affected nodes in a multi-plane topology.

The orchestration component 112 may be a control-plane device and/or system, such as an SDN controller. The orchestration component 112 can function as the command and control system for the fabric of the multi-plane network 102, and can house automated workflows for deploying and managing the network fabric(s). The orchestration component 112 can include automation, design, policy, provisioning, and assurance capabilities, among others. Further, the orchestration component 112 may In the illustrative example, leaf node L1 may have established a plane 1 traffic flow with leaf node L4. The plane 1 flow may be through intermediate node M1, spine node S1 which reflects the traffic through intermediate node M3 and to leaf node L4. However, at "1," a failure 120 may occur in the multi-plane network 102 such that the plane 1 flow is no longer able to reach the leaf node L4 in plane 1. For instance, the failure 120 may occur at intermediate node M1, and/or in the connection 114 between intermediate node M1 and spine node S2.

At "2," the orchestration component 112 may receive telemetry data 202. For instance, the orchestration component 112 may periodically, or continuously, stream telemetry data from devices in the multi-plane network 102. For instance, the orchestration component 112 may receive telemetry data from network devices in the multi-plane network 102 (e.g., switches, routers, servers, etc.) using various techniques, such as Simple Network Management Protocol (SNMP), model-driven telemetry, event-driven telemetry (EDT), Operations, Administration, and Maintenance (OAM), and/or any other mechanism.

At "3," the orchestration component 112 may analyze the telemetry data 202 in order to detect and locate failures in the network 102. The orchestration component 112 may analyze the telemetry data 202 and determine that packets are being dropped due to the failure 120. For instance, the orchestration component 112 may determine that the leaf node L1 is sending traffic flows in the plane 1 flow, but that the spine node S1 is not receiving the plane 1 flow. Thus, the orchestration component 112 may detect the failure 120 by analyzing the telemetry data 202.

At "4," the orchestration component 112 may determine what leaf nodes are affected by the failure (e.g., using a mapping table as discuss further in FIGS. 2-4), and send a failure notification 204 to the leaf nodes 118 affected by the failure 120. The failure notification 204 may be new signaling mechanism that instructs the leaf nodes 118 to change the load balancing techniques, as opposed to changing the routing tables. For instance, the failure notification 204 may be a new signaling mechanism in a routing protocol (e.g., Routing in Fat Trees (RIFT)) that does not affect routing tables, but instead is a load balancing instruction. The failure notification 204 may instruct the affected leaf nodes 118 (in this case L1 and L2) to either (i) not load balance to plane 1 for reaching a prefix associated with leaf node L4 (negative disaggregation), and/or (ii) load balance to plane 2 for reaching the prefix associated with leaf node L4 (positive disaggregation).

At "5," the affected leaf nodes (e.g., L1 in this case) may receive the failure notification 204. In some instances, as described in more detail in FIG. 3, the orchestration component 112 may further predict what leaf nodes 118 might be affected by the failure 120 in the future. For instance, the orchestration component 112 may have analyzed the telemetry data 202 and determine what leaf nodes have previously, or historically, communicated with L4 using plane 1 and that would be affected by the failure 120 if communicating now. For instance, the orchestration component 112 may determine that leaf node L2 would be affected by the failure 120 if communicating with the leaf node L4 using plane 1 routes. Thus, the orchestration component 112 may additionally send the failure notification 204 to the leaf node L2 (potentially after sending the failure notification 204 based on a priority order).

At "6," the leaf node L1 may use plane 2 to communicate from leaf node L1 to leaf node L4 via a plane 2 flow. For instance, L1 may change the load balancing such that traffic flows sent to leaf node L4 are load balanced and sent via plane 2 nodes and connections 114.

Figure 3:
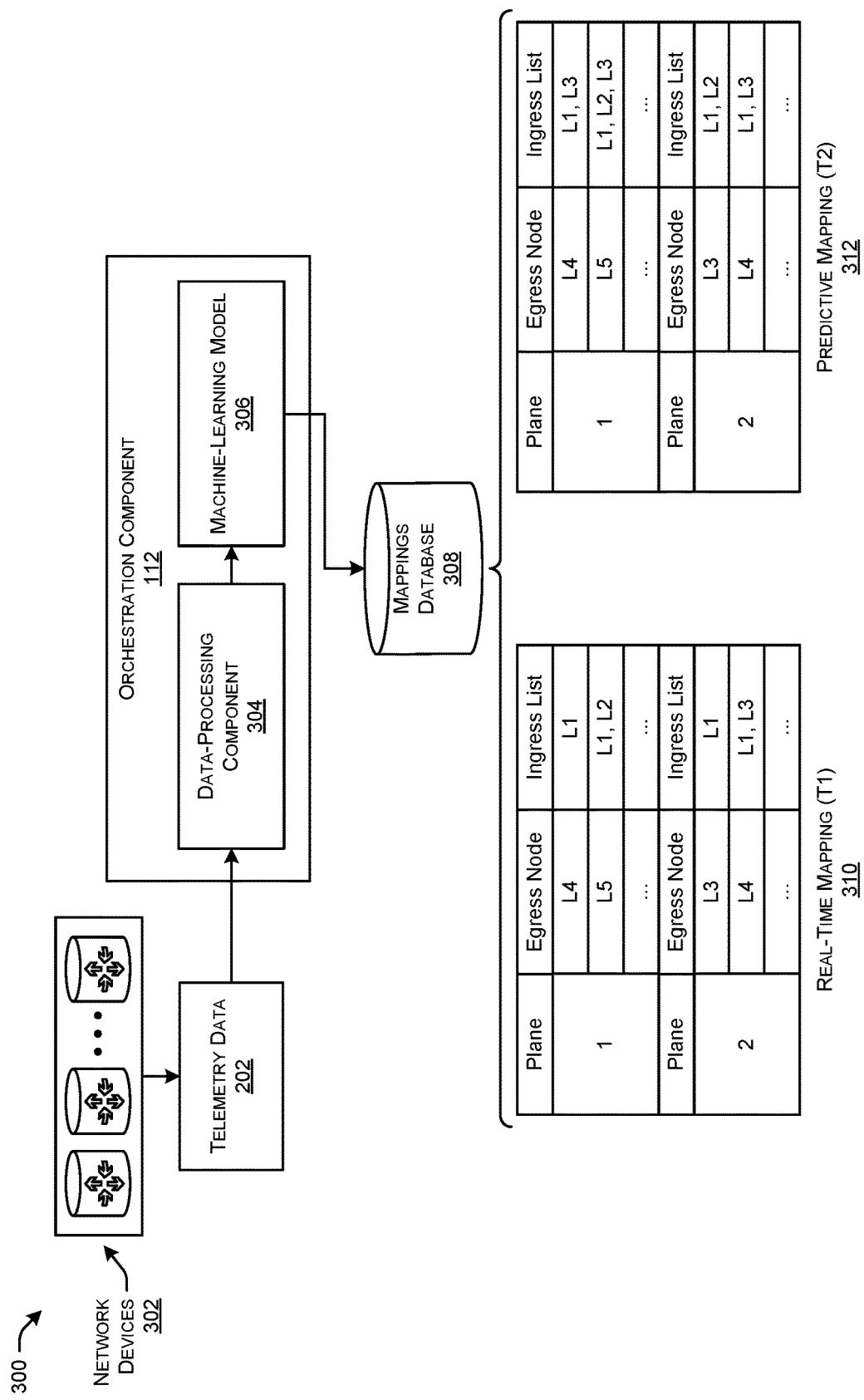
FIG. 3 illustrates a system diagram of an example architecture for an orchestration component to process telemetry data received from network devices in a multi-plane network, and to create mappings that indicate nodes affected by different failures in the multi-plane network.

FIG. 3 illustrates a system diagram 300 of an example architecture for an orchestration component to process telemetry data received from network devices in a multi-plane network, and to create mappings that indicate nodes affected by different failures in the multi-plane network.

At illustrated, the orchestration component 112 may receive telemetry data 202 from one or more network devices 302 (e.g., any type of device or node in the multi-plane network 102 and/or associated with the multi-plane network 102). The orchestration component 112 may further obtain topology information regarding the fabric, as well as telemetry data 202 indicative of state changes of links and/or nodes in the fabric (e.g., up vs. down), either on a push or pull basis from the fabric. For example, orchestration component 112 may request and receive the local logs from routers, redirects of SN MP traps, or the like. In one embodiment, the telemetry data in data 202 may be limited to state changes (e.g. link up/down). In some examples, the telemetry data 202 may be link attributes such as link speed, packet drop rates, queue length, or other data useful in determining that a failure has occurred in the network.

The telemetry data 202 may initially be input into a data-processing component 304 of the orchestration component 112 that performs techniques such as clustering the telemetry data, processing the telemetry data into a format usable by the machine-learning model 306 (e.g., feature vectors), and or other pre-processing techniques. The machine-learning (ML) model 306 may be any type of ML model, such as supervised models, reinforcement models, and/or unsupervised models. The ML model 306 may include one or more of linear regression models, logistic regression models, decision trees, Naive Bayes models, neural networks, k-means cluster models, random forest models, and/or other types of ML models 306. The ML model 306 may be configured to learn the pattern of the traffic flow between leaf nodes 118 and predict potential leaf nodes 118 that need to be notified upon detecting a failure in a plane.

The ML model 306 may continuously, or periodically, analyze the telemetry data 202 to generate mappings in a mappings database 308 that indicate traffic flows, or predicted traffic flows. The ML model 306 may maintain and update a real-time mapping 310 indicating mappings of current traffic flows between leaf nodes 118 at (T1), and may further maintain and update a predictive mapping 312 indicating leaf nodes 118 that have communicate in the past, and are likely to communicate in the future at time (T2). As shown, the mappings database 308 indicate, for the planes in the multi-plane network 102 (e.g., plane 1 and plane 2 in this example), what egress nodes are receiving data from what list of ingress nodes (real-time mapping 310), and also what egress nodes are predicted to receive data from what list of ingress nodes (predictive mapping 312). As illustrated, the real-time mapping 310 indicates that egress node L4 is receiving traffic flows from ingress node L1 in plane 1. Thus, if a failure occurs that affects egress node L4 in plane 1, then the ingress node L1 needs to be notified of the failure affecting the traffic flow to node L4 in plane 1, and instead load balance data flows through plane 2 in order to reach L4. Thus, the real-time mapping 310 and predictive mapping 312 indicate lists of ingress leaf nodes 118 that need to be notified of failures that affect the egress leaf nodes that are mapped to the ingress nodes in the plane in which the failure occurs.

Figure 4:
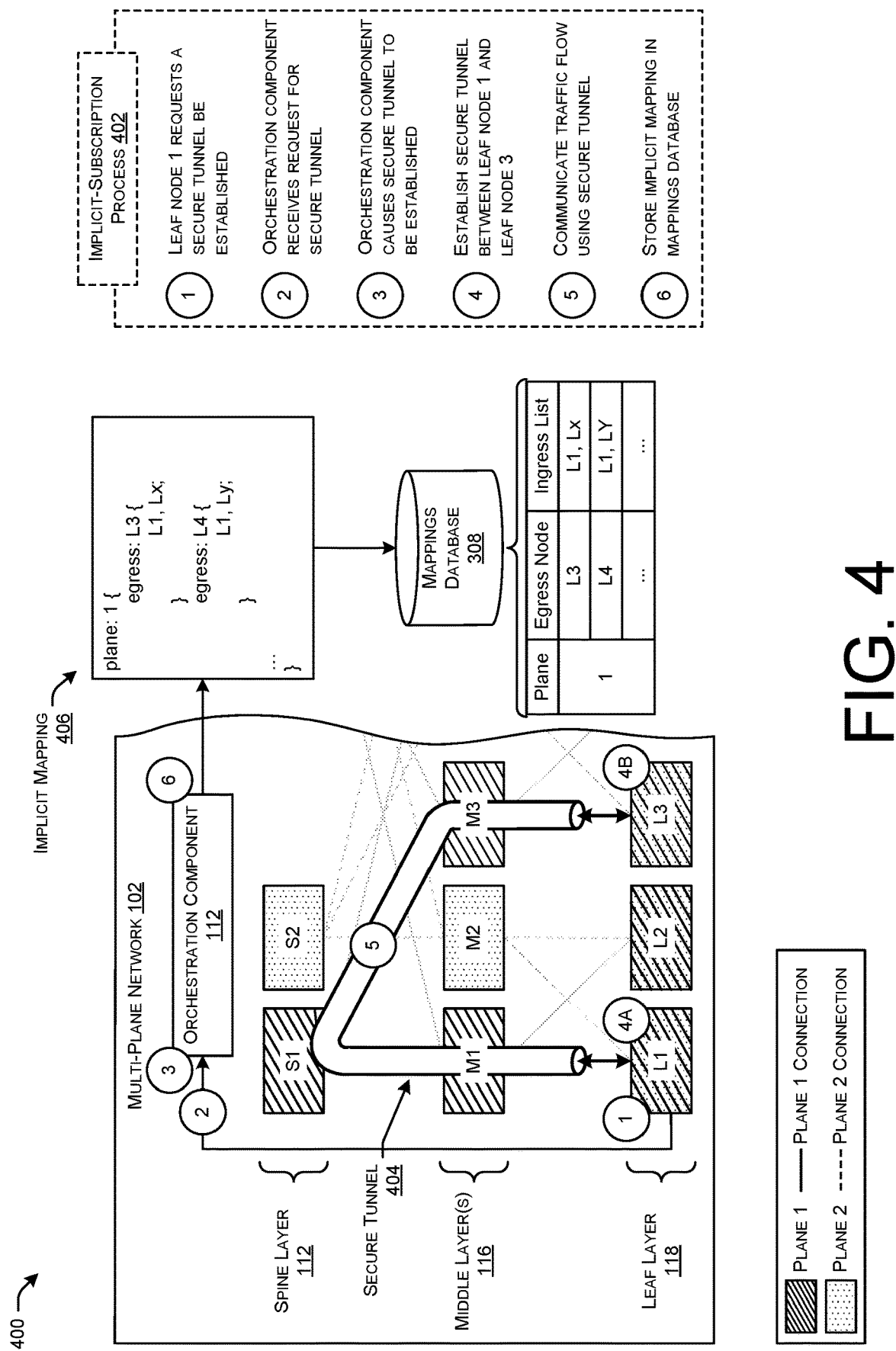
FIG. 4 illustrates a system diagram of an example architecture for an orchestration component to receive a request from a leaf node to establish a secure tunnel with another leaf node, and to determine an implicit mapping between the two leaf nodes.

FIG. 4 illustrates a system diagram 400 of an example architecture for an orchestration component to receive a request from a leaf node to establish a secure tunnel with another leaf node, and to determine an implicit mapping between the two leaf nodes.

Specifically, the orchestration component 112 may be involved in an implicit-subscription process 402 where the orchestration component 112 is able to identify an implicit mapping 406 between leaf nodes 118 in the multi-plane network 102. At "1," a leaf node L1 may send a request to the orchestration component 112 for a secure tunnel to be established. For instance, the leaf node L1 may have traffic destined for a device associated with leaf node L3. The leaf node L1 may need to request the orchestration component 112 to establish a route and a secure tunnel to the leaf node L3 in order to send a traffic flow to a device (or endpoint) connected to leaf node L3.

The orchestration component 112 may receive the request at "2" for the secure tunnel to be established between the leaf node L1 and the leaf node L3, and may send data to the leaf node L1 for establishing the secure tunnel. For instance, the orchestration component 112 may provide the leaf node L1 address information (e.g., prefix, IP address, route, etc.) for the leaf node L3 such that the leaf node L1 is able to establish a secure tunnel with the leaf node L3. For instance, the leaf node L1 may establish a VXLAN tunnel with the leaf node L3 to send traffic through via plane 1 devices.

Thus, the orchestration component 112 is able to determine that the leaf node L1 and the leaf node L3 have a communication path (or traffic flow) based at least in part on the leaf node L1 and leaf node L3 requesting that the orchestration component 112 establish the tunnel. The orchestration component 112 may generate an implicit mapping 406 that is stored in the mappings database 308. In some instances, however, the orchestration component 112 may simply receive an explicit request to create an explicit mapping for the mappings database 308.

Figure 5:
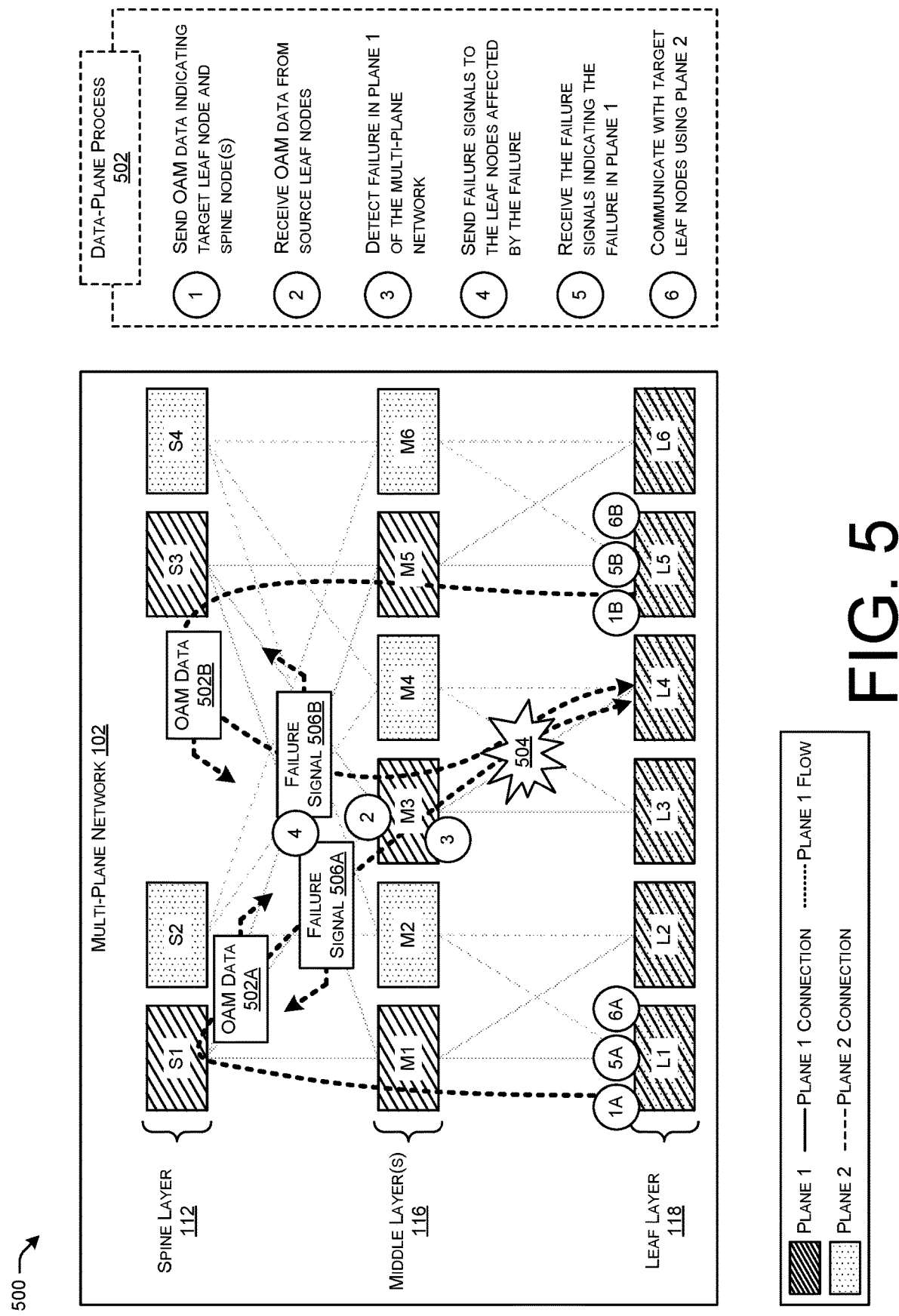
FIG. 5 illustrates a system diagram of an example architecture for a data-plane process where an intermediate node receives OAM data from leaf nodes indicating communication paths, detects a fault in a communication path, and sends a disaggregation advertisement of a prefix affected by a failure to only affected nodes in a multi-plane topology.

FIG. 5 illustrates a system diagram 500 of an example architecture for a data-plane process 502 where an intermediate node receives OAM data from leaf nodes indicating communication paths, detects a fault in a communication path, and sends a disaggregation advertisement of a prefix affected by a failure to only affected nodes in a multi-plane topology.

As illustrated, at step "1" of the process 502, the leaf node L1 may send OAM data in a data packet that indicates a target leaf node L4 for the data packet, and may also include indications of the spine node S1 that reflects the data packet and other traffic. That is, the data-plane process 502 includes leverage iOAM in order to insert relevant ingress leaf details in the iOAM data object, and potentially the spine node S1 that reflected the data packet on the southern path. As shown, the OAM data 502A and 502B are sent from the egress leaf nodes to the egress leaf node L4.

At "2," the intermediate node M3 may receive the IAM data 502 from the leaf nodes L5 and L1. The intermediate node M3 may identify communication paths and traffic flows between the ingress leaf nodes L1 and L5 and the egress leaf node L4. At "3," the intermediate node M3 may detect a failure 504 in the multi-plane network 102. The intermediate node M3 may determine that the data flows to the leaf node L4 are not able to be transmitted in the plane 1.

At "4," the intermediate node M3 may send failure signals 506A and 506B to the ingress leaf nodes L1 and L5. The failure signals may indicate the prefix that is affected by the failure in plane 1, and may also include additional plane details (e.g., indicating what planes to use to communicate with leaf node L4, what planes not to use to communicate with leaf node L4, etc.).

At "5," the ingress leaf nodes L1 and L5 may receive the failure signals, and install a local entry for the prefix associated with leaf node L4 indicating to use another spine other than spine node S1 and/or another plane other than plane 1. In some instances, the local entry may be stored along with lifetime timer information such that spine node 1 and/or plane 1 is not used to send traffic to leaf node L4 for a period of time (e.g., a period of time to allow the failure to clear). When the lifetime timer expires, the leaf nodes L1 and L5 can try using plane 1 again to see they can reach egress leaf node L4. If the ingress leaf nodes L1 and L5 receive a failure signal 506 again, they may reset the timer. Otherwise, they may determine that the failure 504 has cleared and continue using Thus, the data-plane process 502 may include using an intermediate node in the multi-plane network 102 (e.g., intermediate node, spine node, etc.) to identify communication paths between pairs of leaf nodes, 118 determine when failures 504 have occurred in the network 102, and send data-plane notifications (e.g., failure signals 506) to the affected leaf nodes 118 indicating that the failure 504 has occurred. To accomplish this, the leaf nodes 118 may leverage an in-band mechanism, such as iOAM or a similar mechanism, to include control-plane information about the communication path in a data-plane packet. The information may indicate, for example, an indication of the source IP address for the packet, the destination IP address for the packet, the egress leaf node 118 to which the packet is destined, a spine node 112 that is reflecting the data packet, and/or a plane through which the packet is passing. The intermediate nodes (e.g., any node on the communication path of the data packet) may identify the control-plane information for that packet and determine which what leaf nodes are communicating with each other. Upon detecting a failure 504 in the network 102, the intermediate nodes may determine which egress leaf nodes are affected by the failure, and in turn, which ingress leaf nodes are affected by the failure in that they are communicating with the affected egress leaf nodes in the affected plane. The intermediate nodes may then send a failure notification, or a disaggregation advertisement, (e.g., control-plane data in a data-plane packet) to the affected ingress nodes to modify their load-balancing techniques, as explained above.

Figure 6A:
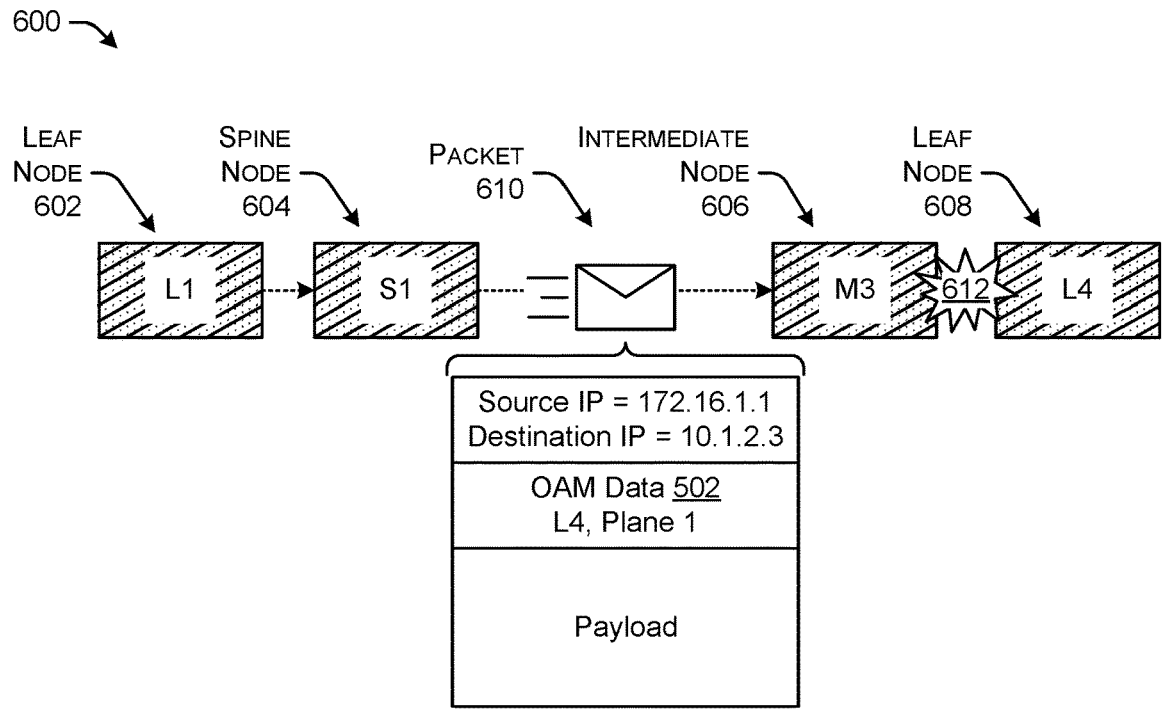
FIG. 6A illustrates an example packet sent from a leaf node that includes OAM data such as an egress node and/or a spine node of the path.

FIG. 6A illustrates an example packet sent from a leaf node that includes OAM data such as an egress node and/or a spine node of the path. As illustrated, a leaf node 602 may send traffic through a spine node 604, to an intermediate node 606, and ultimately to an egress leaf node 608. The traffic may include at least one packet 610 that includes OAM data 502. As shown, the packet 610 may include a source IP address, a destination IP address, a payload, and OAM data 502. As shown, the OAM data may include an indication of a target leaf node 118 (e.g., egress leaf node L4), as well as an indication of the plane through which the packet 610 is moving. In this way, nodes such as the intermediate node 606 may determine information about a packet 610 and flow from OAM data 502 in order to notify only leaf nodes affected by a failure.

Figure 6B:
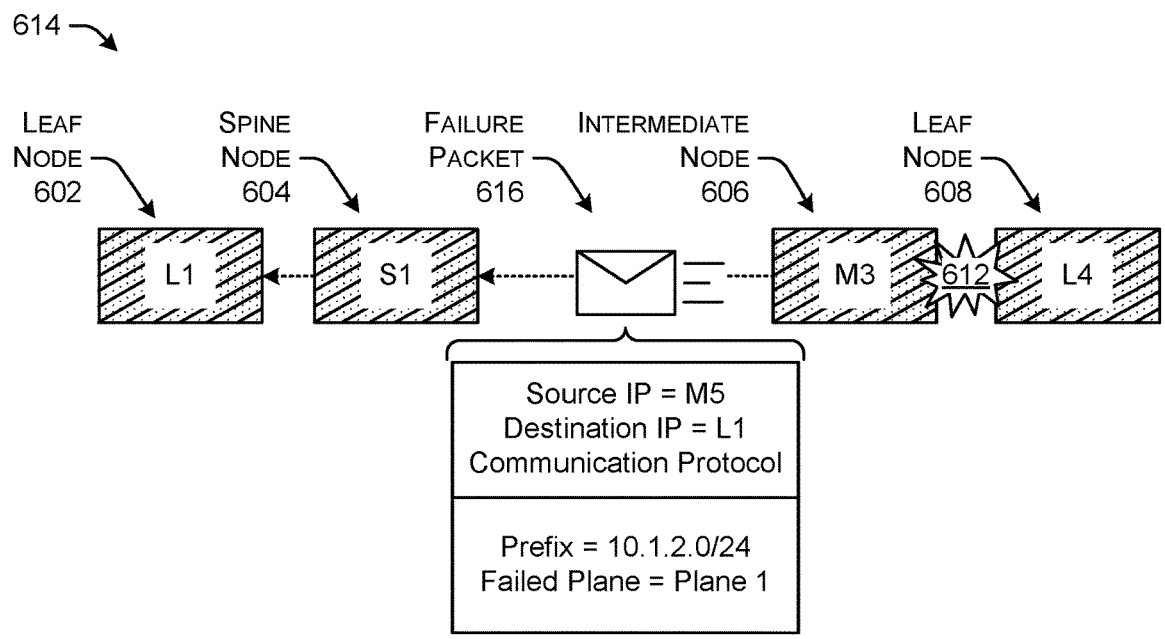
FIG. 6B illustrates an example failure packet sent from an intermediate node and to an affected leaf node that indicates a failure in the network that affects a communication path (e.g., prefix) of the leaf node.

FIG. 6B illustrates an example failure packet sent from an intermediate node and to an affected leaf node that indicates a failure in the network that affects a communication path (e.g., prefix) of the leaf node. As shown in FIG. 6B, the intermediate node 606 may generate and send a failure packet 616 that indicates the failure 612 to the leaf node 602. As shown, the failure packet 616 may indicate the source IP (e.g., intermediate node M5) for the failure packet 616, the destination IP (e.g., leaf node L1), a communication protocol used for the failure packet 616, a prefix that is affected by the failure, and an indication of the failed plane in which the failure 612 occurred.

Figure 7:
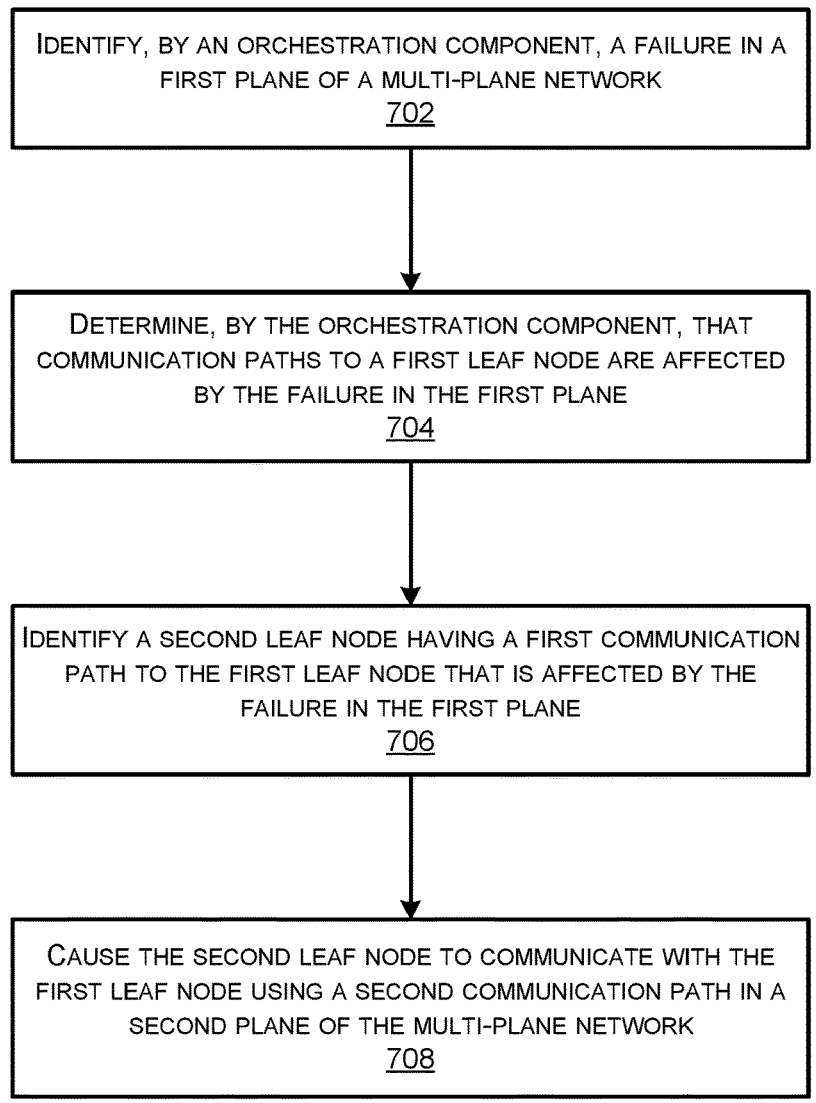
FIG. 7 illustrates a flow diagram of an example method for an orchestration component to perform control-plane techniques to identify a leaf node affected by a failure in the network and send a disaggregation advertisement to that leaf node.
Figure 8:
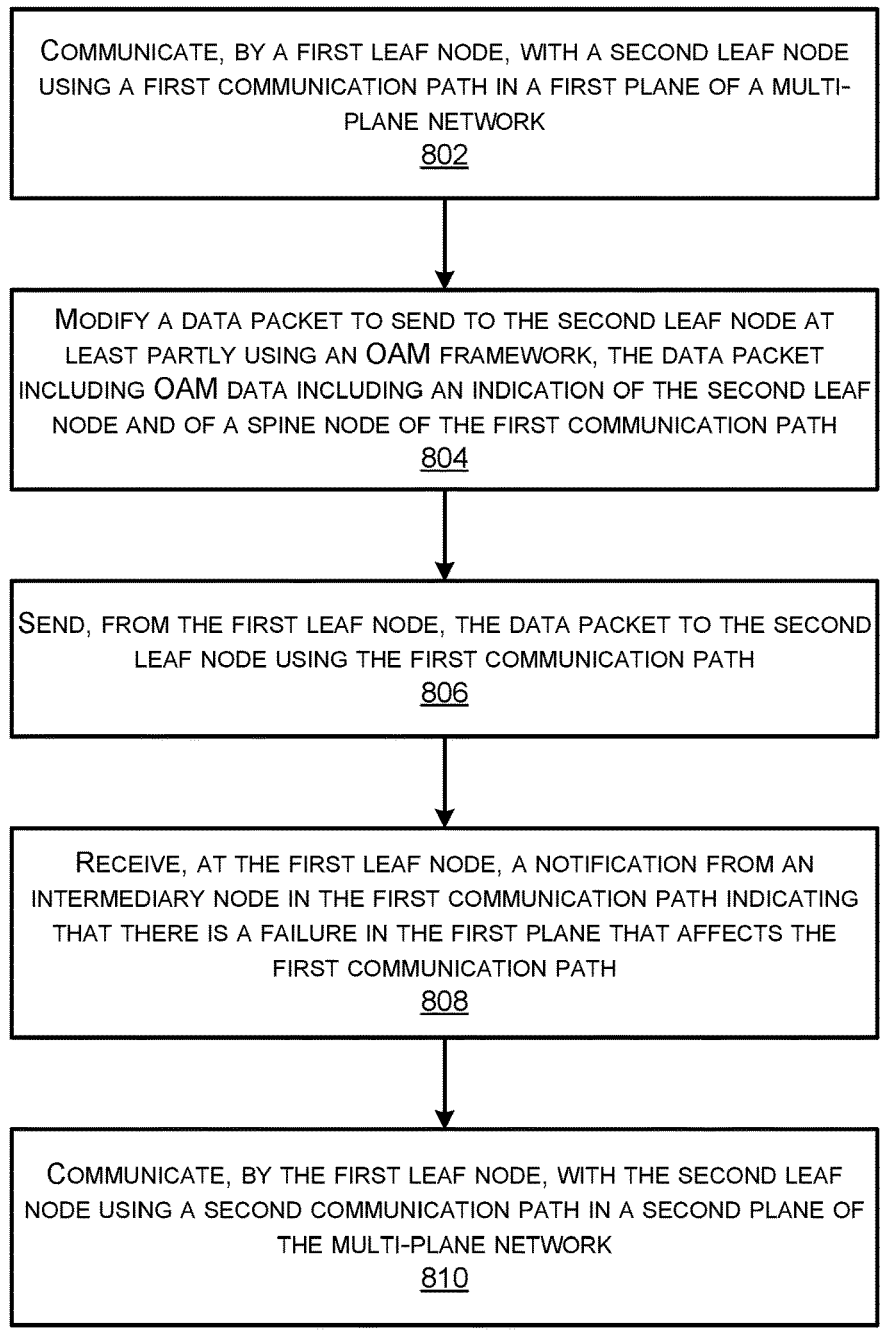
FIG. 8 illustrates a flow diagram of an example method for an intermediate node to perform data-plane techniques to identify a leaf node affected by a failure in the network and send a disaggregation advertisement to that leaf node

FIGS. 7 and 8 illustrate flow diagrams of an example methods 700 and 800 that illustrate aspects of the functions performed at least partly by one or more devices in the multi-plane network 102 as described in FIGS. 1-6B. The logical operations described herein with respect to FIGS. 7 and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 7 and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for an orchestration component 112 to perform control-plane techniques to identify a leaf node affected by a failure in the network and send a disaggregation advertisement to that leaf node. In some examples, the method 700 may be performed by a system comprising one or more processors and one or more non-transitory computer-readable media storing computer-executable instructions that, when executed by the one or more processors, cause the one or more processors to perform the method 700.

At 702, the orchestration component 112 may identify a failure in a first plane of the multi-plane network. For instance, the orchestration component 112 may analyze telemetry data 202 and determine that a failure has occurred in the first plane of the network 102.

At 704, the orchestration component 112 may determine that communication paths to a first leaf node are affected by the failure in the first plane. For instance, the orchestration component 112 may determine that the communication paths are interrupted such that traffic flows in the paths are unable to reach the first leaf node in the first plane due to the failure.

At 706, the orchestration component 112 may identify a second leaf node having a first communication path to the first leaf node that is affected by the failure in the first plane. At 708, the orchestration component 112 may cause the second leaf node to communicate with the first leaf node using a second communication path in a second plane of the multi-plane network.

In some instances, the method 700 may further include identifying a third leaf node having a third communication path to the first leaf node that is affected by the failure in the first plane, and determining that the second leaf node has a first communication flow with the first leaf node associated with a first quality of service (QoS) metric. Further, the orchestration component 112 may determine that the third leaf node has a second communication flow with the first leaf node associated with a second QoS metric, and notify the second leaf node of the failure in the first plane prior to notifying the third leaf node based at least in part on the first QoS metric and the second QoS metric.

FIG. 8 illustrates a flow diagram of an example method 800 for an intermediate node to perform data-plane techniques to identify a leaf node affected by a failure in the network and send a disaggregation advertisement to that leaf node. In some examples, the method 800 may be performed by a system comprising one or more processors and one or more non-transitory computer-readable media storing computer-executable instructions that, when executed by the one or more processors, cause the one or more processors to perform the method 800.

At 802, a first leaf node may communicate with a second leaf node using a first communication path in a first plane of a multi-plane network. At 804, the first leaf node may modify a data packet to send to the second leaf node at least partly using an Operations, Administration, and Maintenance (OAM) framework where the data packet includes OAM data including an indication of the second leaf node and of a spine node of the first communication path. At 806, the first leaf node may send the data packet to the second leaf node using the first communication path. At 808, the first leaf node may receive a notification from an intermediate node in the first communication path indicating that there is a failure in the first plane that affects the first communication path. At 810, the first leaf node may communicate with the second leaf node using a second communication path in a second plane of the multi-plane network.

Figure 9:
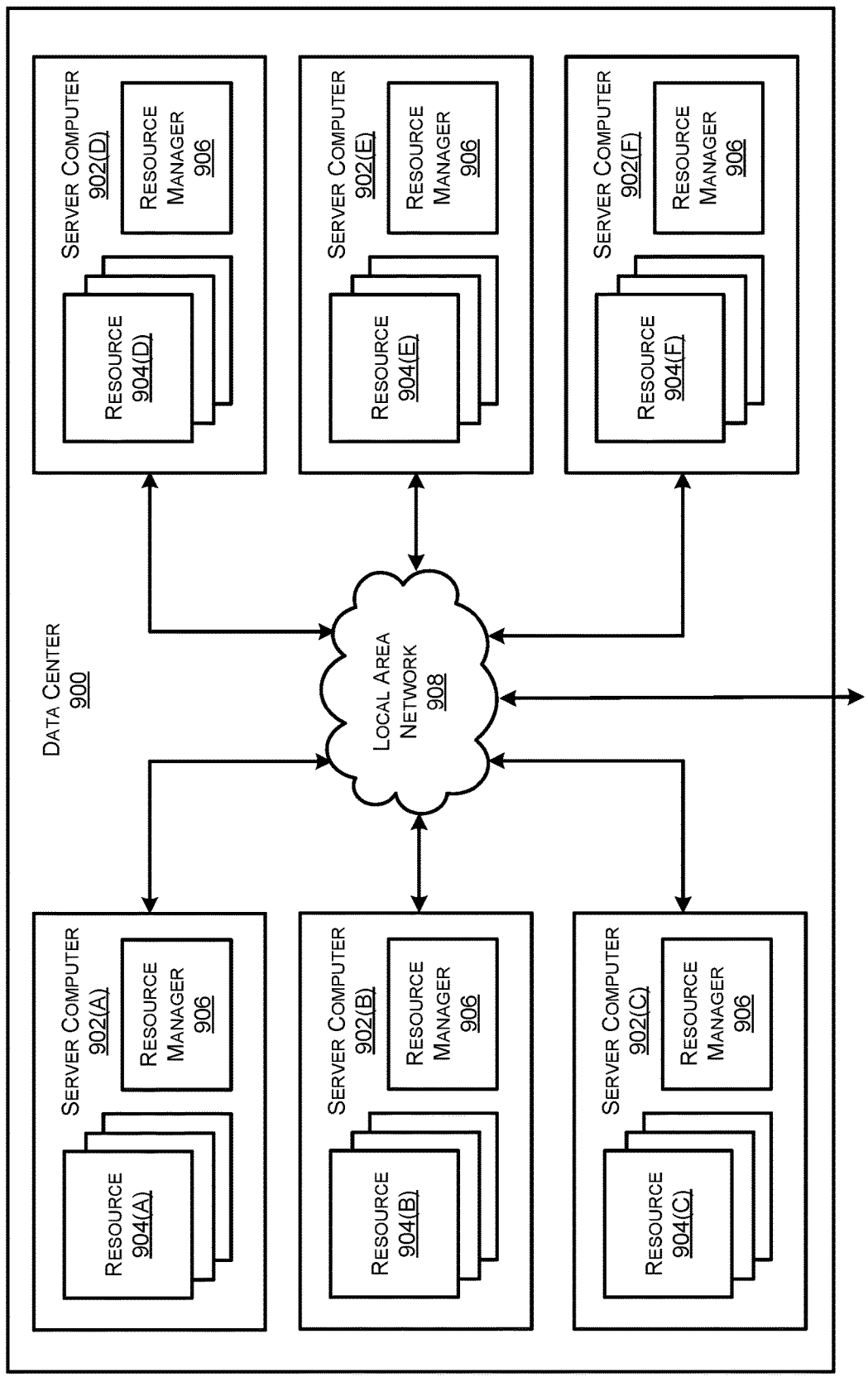
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902A-902E (which might be referred to herein singularly as "a server computer 902" or in the plural as "the server computers 902") for providing computing resources. The data center 900 may correspond to one or more of the data centers 104.

The server computers 902 can be standard tower, rack-mount, or blade server computers configured appropriately for providing the computing resources described herein. As mentioned above, the computing resources provided by the multi-plane network 102 can be data processing resources such as VM instances or hardware computing systems, database clusters, computing clusters, storage clusters, data storage resources, database resources, networking resources, and others. Some of the servers 902 can also be configured to execute a resource manager capable of instantiating and/or managing the computing resources. In the case of VM instances, for example, the resource manager can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

In some examples, the server computers 902 may each execute one or more virtual resources that support a service or application provisioned across a set or cluster of servers 902. The virtual resources on each server computer 902 may support a single application or service, or multiple applications or services (for one or more users).

In some instances, the multi-plane network 102 may provide computing resources, like application containers, VM instances, and storage, on a permanent or an as-needed basis. Among other types of functionality, the computing resources may be provided by cloud computing networks and may be utilized to implement the various services described above. The computing resources provided by the cloud computing networks can include various types of computing resources, such as data processing resources like application containers and VM instances, data storage resources, networking resources, data communication resources, network services, and the like.

Each type of computing resource provided by the cloud computing networks can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing networks can also be configured to provide other types of computing resources not mentioned specifically herein.

The computing resources provided by the cloud computing networks may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations.

Figure 10:
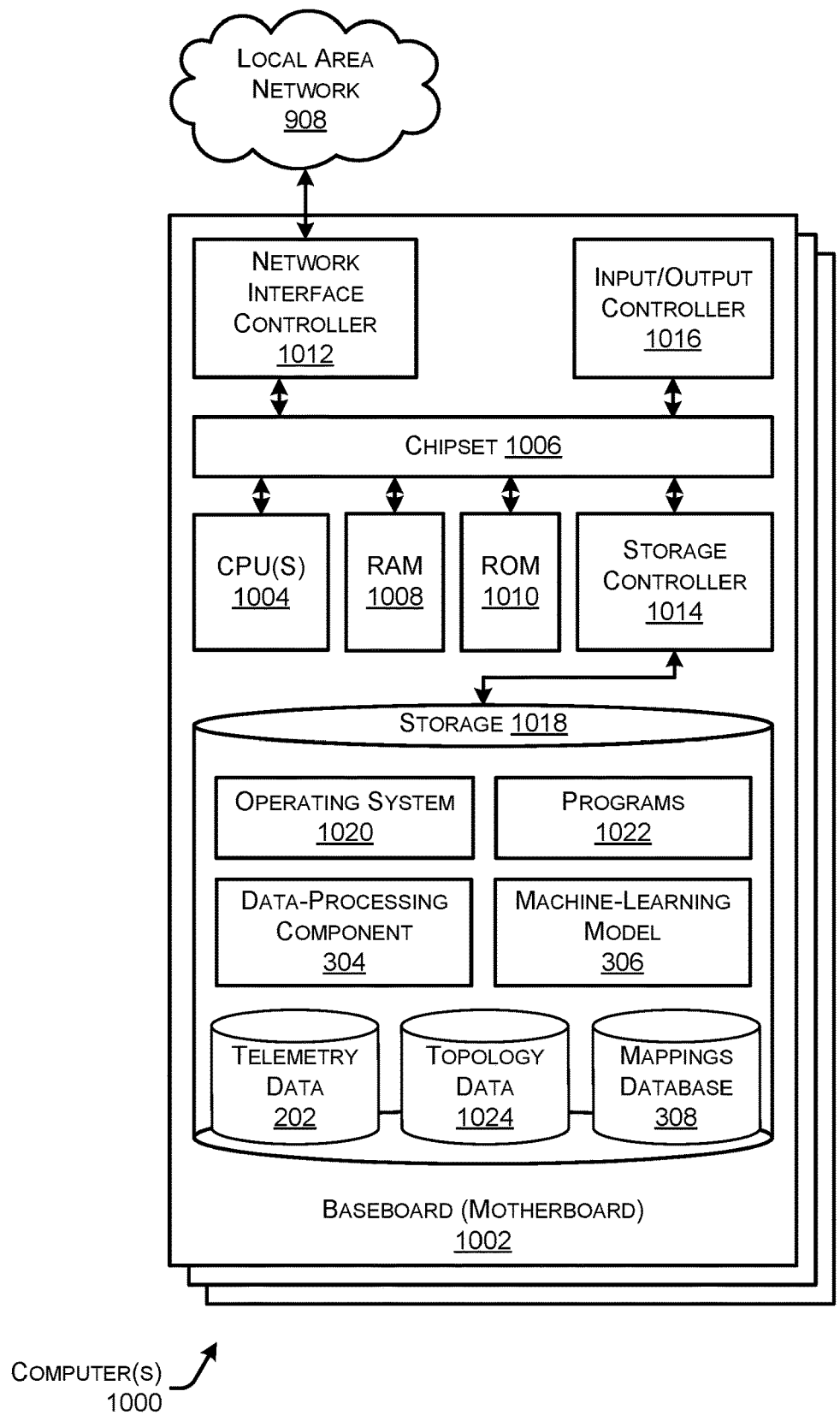
FIG. 10 is a computer architecture diagram showing an illustrative computer hardware architecture for implementing a computing device that can be utilized to implement aspects of the various technologies presented herein.

FIG. 10 shows an example computer architecture for one or more computers 1000 (e.g., a single computer, a system of computers, etc.) capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computer 1000 may, in some examples, correspond to a physical devices or resources described herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 1000 to other computing devices over the network 908. It should be appreciated that multiple NICs 1012 can be present in the computer 1000, connecting the computer to other types of networks and remote computer systems.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the cloud computing network, and or any components included therein, may be supported by one or more devices similar to computer 1000. Stated otherwise, some or all of the operations performed by the cloud computing network 102, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-8. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

The computer 1000 may support a virtualization layer, such as one or more virtual resources executing on the computer 1000. In some examples, the virtualization layer may be supported by a hypervisor that provides one or more virtual machines running on the computer 1000 to perform functions described herein. The virtualization layer may generally support a virtual resource that performs at least portions of the techniques described herein.

In some instances, the orchestration component 112 may be supported by the computer 1000, and/or a system of computers 1000, to perform the techniques described herein. Thus, the various components and functionality may be stored in, and executed by, the computer 1000 and/or a system of computers 1000.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    by a first leaf node, communicating with a second leaf node using a first communication path in a first plane of a multi-plane network;
    populating, at the first leaf node, a data packet with In situ Operations, Administration, and Maintenance (iOAM) data indicating the first leaf node and of a spine node of the first communication path that is reflecting the data packet;
    sending, from the first leaf node, the data packet to the second leaf node using the first communication path;
    determining, by an intermediate node that received the data packet, that there is a failure in the first plane;
    determining, by the intermediate node, that the iOAM data in the data packet indicates that the first leaf node is an ingress node for the data packet;
    based at least in part on the iOAM data indicating that the first leaf node is communicating the data packet and the failure in the first plane, sending, from the intermediate node, a notification to the first leaf node indicating the failure in the first plane;
    receiving, at the first leaf node, the notification indicating the failure in the first plane that affects the first communication path; and
    by the first leaf node, communicating with the second leaf node using a second communication path in a second plane of the multi-plane network.

2. The method of claim 1, further comprising:
    identifying, at least partly by the intermediate node, a plurality of leaf nodes that are communicating traffic to an address associated with the failure in the first plane; and
    sending, from the intermediate node, notifications to individual ones of the plurality of leaf nodes indicating the failure in the first plane.

3. The method of claim 1, further comprising:
    storing, at the first leaf node, an entry mapped to an address associated with the first communication path, the entry comprising at least one of (i) a first indication to use at least one of a different spine node in the first plane to reach the second leaf node or (ii) a second indication to use a different plane than the first plane to reach the second leaf node.

4. The method of claim 1, further comprising determining to refrain from load balancing communication flows through the first plane to the first leaf node.

5. The method of claim 1, further comprising:
    detecting an end of a predefined period of time; and
    based at least in part on detecting the end of the predefined period of time, by the first leaf node, attempting to communicate with the second leaf node using the first communication path in the first plane.

6. The method of claim 1, wherein the data packet is populated at least partly using an Operations, Administration, and Maintenance (OAM) framework.

7. A system comprising:
    one or more processors; and
    one or more non-transitory computer-readable media storing computer-executable instructions that, when executed by the one or more processors, cause the one or more processors to perform operations comprising:
        by a first leaf node, communicating with a second leaf node using a first communication path in a first plane of a multi-plane network;
        populating, at the first leaf node, a data packet with In situ Operations, Administration, and Maintenance (iOAM) data indicating the first leaf node and of a spine node of the first communication path that is reflecting the data packet;
        sending, from the first leaf node, the data packet to the second leaf node using the first communication path;
        determining, by an intermediate node that received the data packet, that there is a failure in the first plane;
        determining, by the intermediate node, that the iOAM data in the data packet indicates that the first leaf node is an ingress node for the data packet;
        based at least in part on the iOAM data indicating that the first leaf node is communicating the data packet and the failure in the first plane, sending, from the intermediate node, a notification to the first leaf node indicating the failure in the first plane;

receiving, at the first leaf node, the notification indicating the failure in the first plane that affects the first communication path; and by the first leaf node, communicating with the second leaf node using a second communication path in a second plane of the multi-plane network.

8. The system of claim 7, the operations further comprising:

identifying, at least partly by the intermediate node, a plurality of leaf nodes that are communicating traffic to an address associated with the failure in the first plane; and sending, from the intermediate node, notifications to individual ones of the plurality of leaf nodes indicating the failure in the first plane.

9. The system of claim 7, the operations further comprising:

storing, at the first leaf node, an entry mapped to an address associated with the first communication path, the entry comprising at least one of (i) a first indication to use at least one of a different spine node in the first plane to reach the second leaf node or (ii) a second indication to use a different plane than the first plane to reach the second leaf node.

10. The system of claim 7, the operations further comprising determining to refrain from load balancing communication flows through the first plane to the first leaf node.

11. The system of claim 7, the operations further comprising:

detecting an end of a predefined period of time; and based at least in part on detecting the end of the predefined period of time, by the first leaf node, attempting to communicate with the second leaf node using the first communication path in the first plane.

12. The system of claim 7, wherein the data packet is populated at least partly using an Operations, Administration, and Maintenance (OAM) framework.

13. The system of claim 7, further comprising receiving, at the first leaf node, an instruction from the intermediate node to refrain from communicating using the first communication path and to instead communicate using the second communication path in the second plane.

14. One or more non-transitory computer-readable media storing computer-executable instructions that, when executed by one or more processors, cause the one or more processors to perform operations comprising:

by a first leaf node, communicating with a second leaf node using a first communication path in a first plane of a multi-plane network;

populating, at the first leaf node, a data packet with In situ Operations, Administration, and Maintenance (iOAM) data indicating the first leaf node and of a spine node of the first communication path that is reflecting the data packet;

sending, from the first leaf node, the data packet to the second leaf node using the first communication path;

determining, by an intermediate node that received the data packet, that there is a failure in the first plane;

determining, by the intermediate node, that the iOAM data in the data packet indicates that the first leaf node is an ingress node for the data packet;

based at least in part on the iOAM data indicating that the first leaf node is communicating the data packet and the failure in the first plane, sending, from the intermediate node, a notification to the first leaf node indicating the failure in the first plane;

receiving, at the first leaf node, the notification indicating the failure in the first plane that affects the first communication path; and by the first leaf node, communicating with the second leaf node using a second communication path in a second plane of the multi-plane network.

15. The one or more non-transitory computer-readable media of claim 14, the operations further comprising:

identifying, at least partly by the intermediate node, a plurality of leaf nodes that are communicating traffic to an address associated with the failure in the first plane; and sending, from the intermediate node, notifications to individual ones of the plurality of leaf nodes indicating the failure in the first plane.

16. The one or more non-transitory computer-readable media of claim 14, the operations further comprising:

storing, at the first leaf node, an entry mapped to an address associated with the first communication path, the entry comprising at least one of (i) a first indication to use at least one of a different spine node in the first plane to reach the second leaf node or (ii) a second indication to use a different plane than the first plane to reach the second leaf node.

17. The one or more non-transitory computer-readable media of claim 14, the operations further comprising determining to refrain from load balancing communication flows through the first plane to the first leaf node.

18. The one or more non-transitory computer-readable media of claim 14, the operations further comprising:

detecting an end of a predefined period of time; and based at least in part on detecting the end of the predefined period of time, by the first leaf node, attempting to communicate with the second leaf node using the first communication path in the first plane.

19. The one or more non-transitory computer-readable media of claim 14, wherein the data packet is populated at least partly using an Operations, Administration, and Maintenance (OAM) framework.

20. The one or more non-transitory computer-readable media of claim 14, further comprising receiving, at the first leaf node, an instruction from the intermediate node to refrain from communicating using the first communication path and to instead communicate using the second communication path in the second plane.

* * * * *